Nov. 19, 1935.  W. B. BRONANDER  2,021,170
MACHINE FOR DRIVING SPIKES IN RAILROAD TIES
Filed Jan. 20, 1933  3 Sheets-Sheet 3
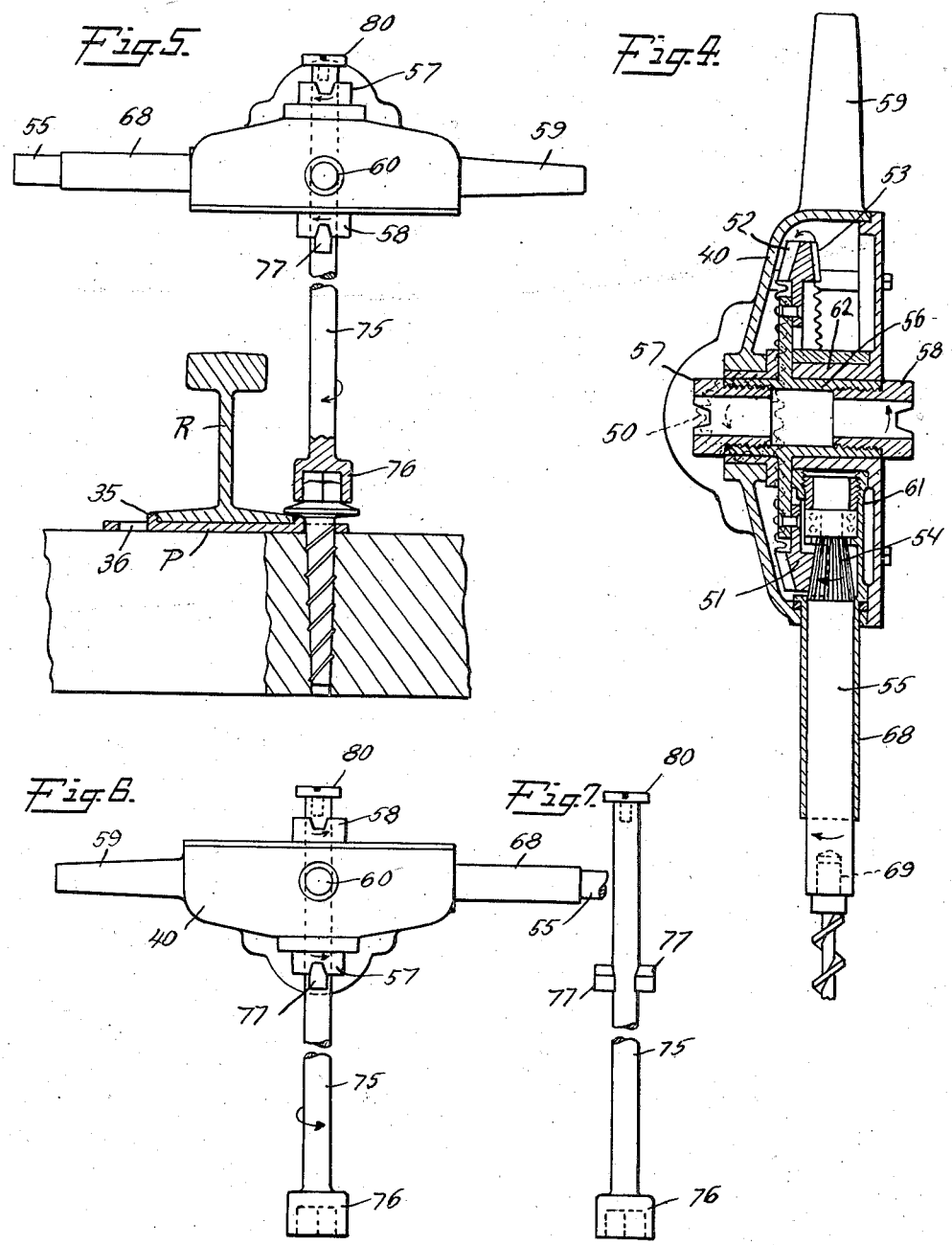
INVENTOR
Wilhelm B. Bronander
BY
Marshall & Hawley.
ATTORNEYS Patented Nov. 19, 1935

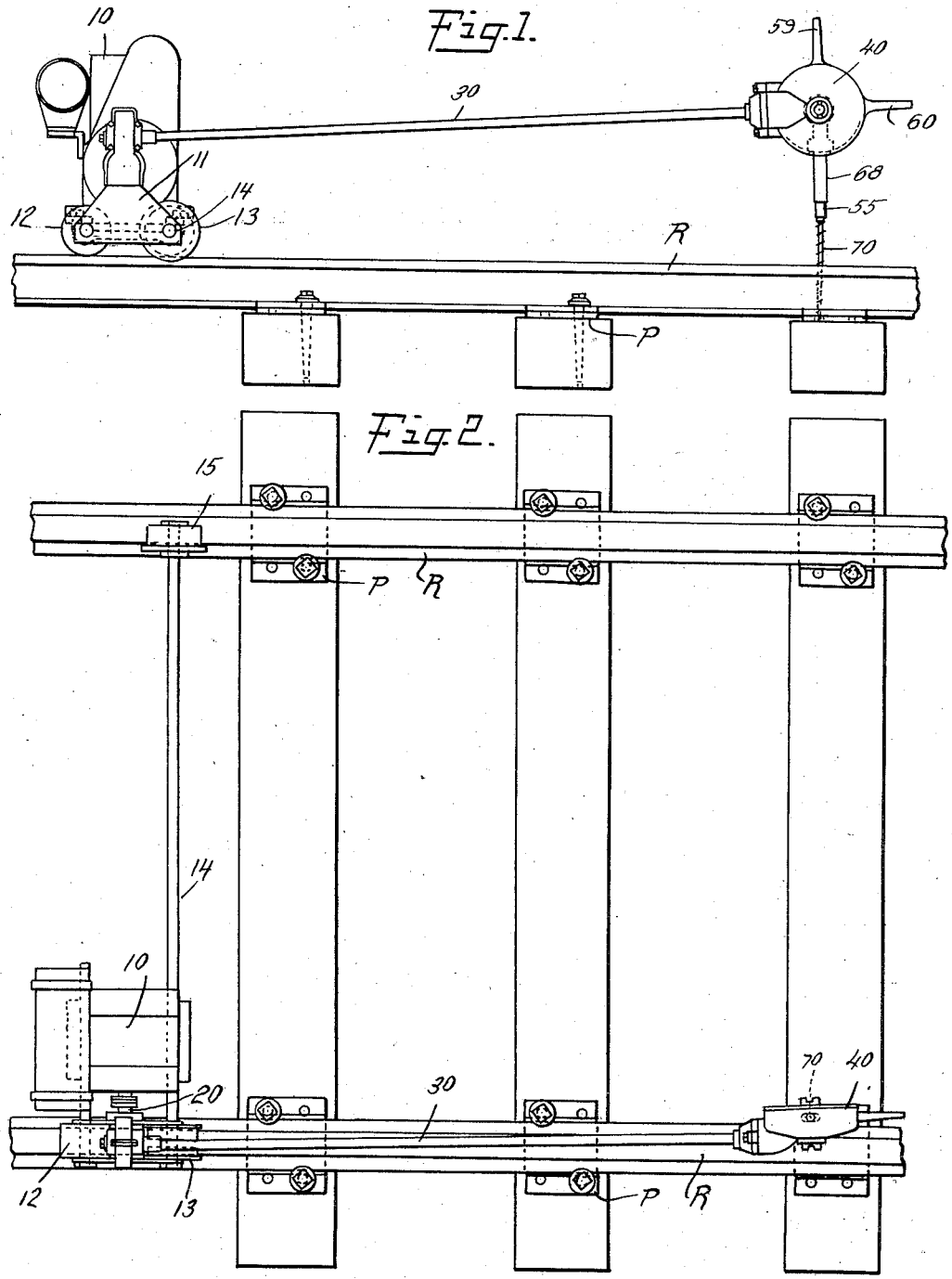

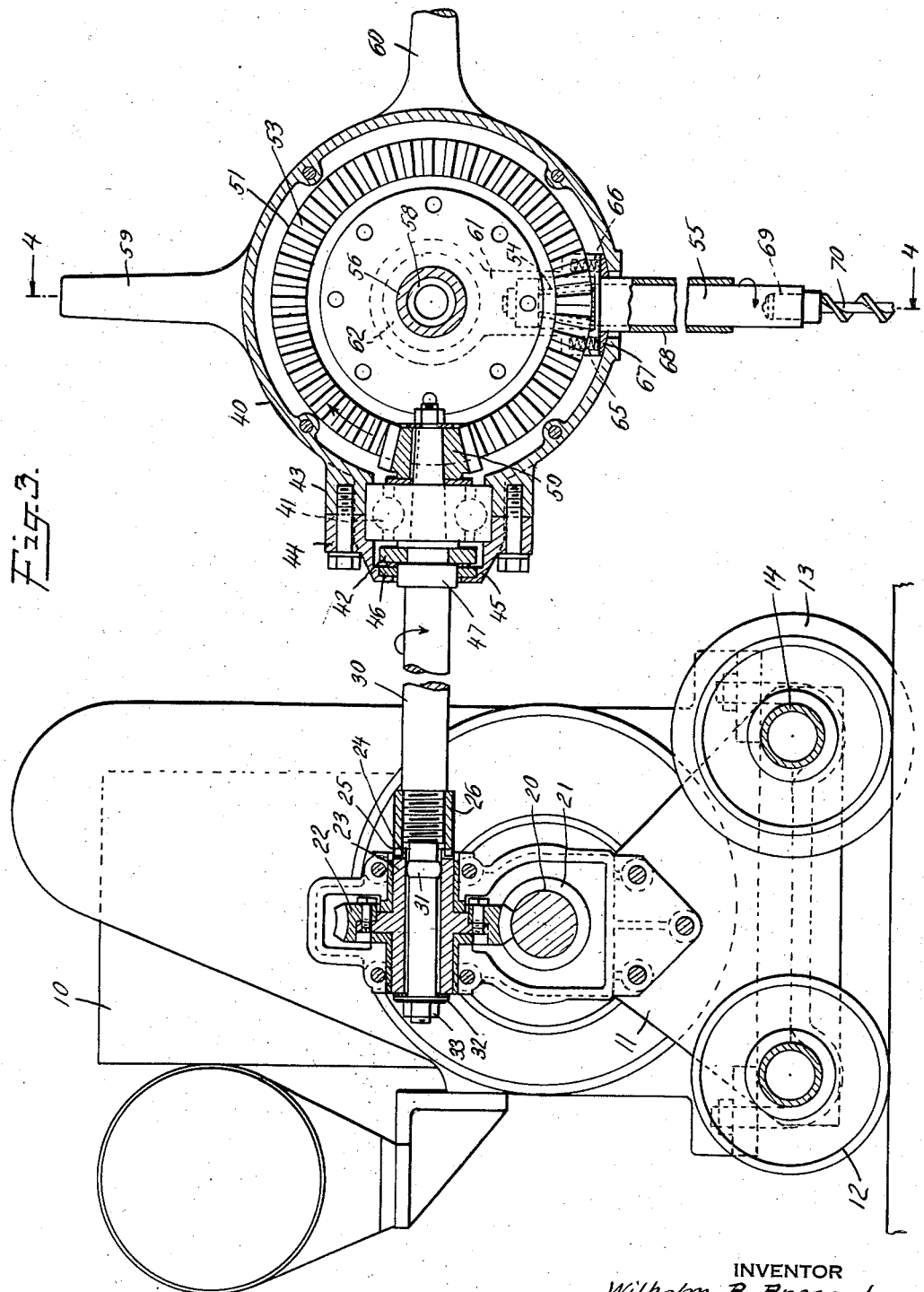

2,021,170

UNITED STATES PATENT OFFICE 2,021,170

MACHINE FOR DRIVING SPIKES IN RAILROAD TIES

Wilhelm B. Bronander, Montclair, N. J.

Application January 20, 1933, Serial No. 652,642

7 Claims. (Cl. 144—32)

This invention relates to a machine for driving spikes in railroad ties.

More particularly stated the invention relates to a machine which has been developed for the purpose of drilling spike holes and driving and removing screw spikes. Although the machine has been particularly developed for spiking down railroad ties and removing the spikes it should be understood that it is not limited to this use but may be utilized for other similar purposes.

The invention has for its salient object to provide a simple and practical machine so constructed and arranged that it can be used at will to drill spike holes and drive or remove screw spikes.

Another object of the invention is to provide a machine capable of performing the functions above mentioned without necessitating the reversal of drive of the motor or main driving shaft or the use of any clutch shifting mechanism or like device.

Further objects of the invention will appear from the following specification taken in connection with the drawings which form a part of this application, and in which Fig. 1 is a side elevation of a device constructed in accordance with the invention;

Fig. 2 is a top plan view of the structure shown in Fig. 1;

Fig. 3 is a vertical sectional elevation on an enlarged scale of the device shown in Figs. 1 and 2;

Fig. 4 is a vertical sectional elevation taken substantially on line 4—4 of Fig. 3;

Fig. 5 is a side elevation, partly in section, showing the tool head in the position in which it is placed for screwing down the spikes;

Fig. 6 is a similar view of the tool head reversed 180° from the position shown in Fig. 5 and so positioned as to unscrew the spikes; and Fig. 7 is a detail elevational view of the tool used with the tool head for screwing in and unscrewing the spikes.

The invention briefly described consists of a machine which has been developed particularly for use in drilling spike holes for railroad ties and screwing in and removing spikes. The machine is mounted on a frame carried by a wheeled truck and adapted to be rolled along the railroad track. A motor, such as a gasoline engine, may furnish the power for driving the tool head and the head is carried by a shaft which is connected to the motor drive in such a manner that a limited swinging movement is permitted. The tool head is rotatably mounted and is provided with a plurality of driving connections whereby it may be used to drill the hole, screw in the spike or unscrew the spike, as desired. This is accomplished without requiring the use of any clutch shifting mechanism and in the form of the invention shown the drill driving shank extends from the tool head in one direction and the drive for screwing in or unscrewing the spike extends in other directions. The tool head is swiveled on the drive transmission shaft so that any one of the driving connections can be utilized at will by rotating the tool head to the proper position.

Further details of the invention will appear from the following description.

In the particular embodiment of the invention illustrated in the drawings the driving motor, such as a gasoline engine 10, is carried by a frame 11 supported by a pair of wheels 12 and 13. An axle 14 of the wheel 13 is extended across the track and carries on its other end a wheel 15 which rests on the rail parallel to the one on which the wheels 12 and 13 rest.

The motor or engine drives the shaft 20, shown in Fig. 3, which carries a worm gear 21 which in turn is engaged by a worm gear 22. The gear 22 is carried by a sleeve 23 having clutch teeth 24 at one end arranged to coact with and drive complementary clutch teeth 25 carried by a sleeve 26. The sleeve 26 is fixed to a drive transmission shaft 30 which extends into the sleeve 23 and is provided with an arcuate annular flange or collar 31 which engages the inner surface of the sleeve 23. The remaining portion of the shaft 30 which is disposed within the sleeve is spaced from the inner surface of the sleeve thereby permitting a limited swinging movement about the collar 31 as a pivot or axis. A washer 32 on the rear end of the shaft engages the end of the sleeve 23 and is held in place by a nut 33.

From the foregoing description it will be evident that when the engine drives the shaft 20 the gear 22 will be rotated and through the clutch members or teeth 24 and 25 will drive the shaft 30.

The shaft 30 is relatively long and is permitted the limited swinging movement above described in order to enable holes to be drilled and spikes to be driven or removed from the plates on opposite sides of the rails. The rails R are usually set in rail plates P having flanges 35 at each side of the rail and having holes 36 for receiving the spikes. Two holes are usually provided on each side of the rail, as shown in Fig. 2.

On the other end of the shaft 30 from the engine end there is swiveled a tool head or casing 40 which is mounted on a ball bearing 41 carried by the end of the shaft 30. The shaft 30 is provided with a collar 42 which is disposed in a coupling formed by a portion 43 of the casing and a removable member 44 which is connected to the portion 43 of the casing. The member 44 has a flange 45 which embraces the collar 42 and suitable packing 46 is carried by the flange and engages an annular shoulder 47 formed on the shaft. The mounting of the tool head or casing 40 on the ball bearing 41 permits the casing to be rotated to any position about the axis of the shaft 30 or of the ball bearing as a pivot.

As shown particularly in Figs. 3 and 4, a beveled gear 50 is mounted on the end of the shaft 30 and meshes with a gear 51 which is rotatably mounted in the casing about an axis at right angles to the shaft 30. The gear 51, as shown in Fig. 4, is provided with oppositely facing annular teeth 52 and 53, the teeth 52 meshing with the teeth of the gear 50. The teeth 53 mesh with a gear 54 carried by a shaft 55 which is disposed at right angles to the shaft 30 and also at right angles to the axis of rotation of the gear 50.

The gear 51 is carried by a sleeve 56 which is centrally mounted in the tool head 40 and has threaded in opposite ends thereof by right and left hand threads a pair of clutch members 57 and 58. Handles 59 and 60 project radially from the tool head or casing 40 at right angles to each other.

The gear 54 is carried by a frame 61 which is pivotally mounted on a sleeve 62 projecting into the casing or tool head 40 and disposed centrally thereof and coaxially with the axis of the gear 50. The frame 61 is provided with springs 65 and 66 which engage a flange 67 carried by a sleeve 68 which surrounds the shank or shaft 55. As will be seen particularly in Fig. 3 there is a slight clearance between the sleeve 68 and the walls of the opening in the tool head or casing 40, through which the sleeve extends. The springs 65 and 66 press the flange 67 into engagement with the inner wall of the tool head and prevent the escape of lubricant from the tool head or casing, the gearing in the tool head preferably running in oil.

The shank 55 has a socket 69 at its outer end for receiving a bit 70 which is used to bore the holes in the ties for receiving the screw spikes.

The spikes are screwed in by means of a shank 75, shown particularly in Figs. 5, 6 and 7, and having a socket 76 at one end for receiving the head of the spike. The shank 75 carries intermediate its ends a pair of clutch teeth 77 which are adapted to seat in the clutch members 57 or 58 carried by the sleeve 56.

When the spike is to be screwed in the shank 75 is inserted in the sleeve 56 in such a direction that the teeth 77 will engage the clutch member 58, as shown in Fig. 5. The shank will then be rotated in a direction to screw in the spike. The shank is held in the sleeve by means of a screw 80 disposed at the end of the shaft opposite the socket end 76 and adapted to prevent the shank from dropping out of the sleeve in the manner shown in Figs. 5 and 6. It will be noted, however, that the distance between the clutch teeth 77 of the shank 75 and the screw 80 is sufficient to permit a limited longitudinal movement of the shank in the sleeve 56 so that the clutch teeth 77 because of their beveled edges may ride out of the clutch member 57 or 58 when the spike has been screwed down to its limit, or in case some obstruction is encountered when the spike is being screwed out.

Operation

The tool head is shown in Figs. 1 to 4 inclusive in position to bore or drill a hole in a tie. It will be obvious that as pressure is applied to the tool head by pressing down on the handles a hole will be bored. After the hole has been bored the tool head is lifted up to remove the bit from the hole and is rotated at right angles to the position shown in Fig. 5. A spike is placed in the hole and the socket 76 at the lower end of the shank 75 is placed over the head of the spike and as pressure is applied the spike will be screwed in the manner shown in Fig. 5. Should it be desired to remove the spike from the hole the shank 75 is reversed in the sleeve 56 whereupon the clutch teeth 77 on the shank will engage the clutch member 57 which is rotated in a direction opposite from the direction of rotation of the clutch member 56 since the clutch head has been reversed or rotated through 180°. The direction of rotation of the shank 75 being thus reversed the spike will be screwed out. The mounting of the rear end of the shaft 30 in the sleeve 23 permits a limited swinging movement of the shaft and thus enables the operator to drill holes on either side of the tie. Furthermore, a limited swinging movement is permitted for the shaft 55 since this shaft is carried by the pivoted frame 61.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A machine of the character described comprising a power operated drive shaft, a tool head rotatably adjustable to a plurality of positions on said shaft, a tool driving shank carried by said tool head and operatively connected to said drive shaft, a second shaft carried by the tool head operatively connected to the drive shaft and having tool driving means at each end thereof arranged to receive a tool, said tool head being adjustable to position said shank or either end of the second shaft in operative position, said second shaft having its axis intersecting the axes of the drive shaft and shank.

2. A machine of the character described comprising a power operated drive shaft, a tool head rotatably adjustable to a plurality of positions on said shaft, a tool driving shank carried by said tool head and operatively connected to said drive shaft, a second shaft carried by the tool head, disposed at an angle to the shank and having its axis intersecting the axes of the shank and drive shaft, said second shaft being operatively connected to the drive shaft and having tool driving means at each end thereof arranged to receive a tool, said tool head being adjustable to position said shank or either end of the second shaft in operative position.

3. A machine of the character described comprising a drive shaft, a tool head rotatably adjustable to a plurality of positions on said shaft, a tool driving shank carried by said tool head and operatively connected to said drive shaft, a second shaft carried by the tool head, disposed at an angle to the shank and to the drive shaft and having its axis intersecting the axes of the shank and drive shaft, said second shaft being operatively connected to the drive shaft and having tool driving means at each end thereof arranged to receive a tool, said tool head being adjustable to position said shank or either end of the second shaft in operative position.

4. In combination, a power operated drive shaft having a beveled pinion thereon, a tool head swiveled on the drive shaft, a beveled gear in said head meshing with said pinion, a tool shaft carried by the tool head and driven by said gear, and a sleeve in said head driven by said beveled gear and having tool driving means at both ends thereof.

5. A machine for drilling spike holes and driving rail spikes comprising portable supporting means including an axle, wheels at the ends thereof adapted to rest on the rails of a railway track, a motor supported on said axle and having a drive shaft, a transmission shaft above one of said supporting wheels and operatively connected to the motor drive shaft by a floating connection constructed and arranged to transmit the drive and to permit limited lateral swinging movement of the transmission shaft relative to the drive shaft, and a tool head swiveled to the other end of the transmission shaft, said tool head having a plurality of tool shafts operatively connected to said transmission shaft, the axes of said tool shafts intersecting.

6. A machine for drilling spike holes and driving rail spikes comprising portable supporting means including an axle, wheels at the ends thereof adapted to rest on the rails of a railway track, a motor supported on said axle and having a drive shaft, a transmission shaft above one of said supporting wheels and above the rail on which said wheel rests and operatively connected to the motor drive shaft by a floating connection constructed and arranged to permit limited lateral swinging movement of the transmission shaft relative to the drive shaft, and a tool head swiveled to the other end of the transmission shaft, said tool head having a plurality of tool shafts operatively connected to said transmission shaft, the axes of said tool shafts intersecting, certain of said tool shafts being disposed at right angles to others of said tool shafts.

7. A machine of the character described comprising a frame, wheels for supporting said frame on the rails of a railroad track, a motor on the frame, a shaft driven thereby, a second shaft, operative floating driving connections between said shafts, to permit limited swinging movement of the second shaft about one end thereof, a tool head comprising a casing rotatably mounted on said second shaft, a tool driving shank carried by said casing and operatively driven by said second shaft, and a second tool driving shaft operatively driven by the drive shaft and disposed at right angles to the shank, said tool head and casing being rotatable to position either said shank or second tool driving shaft in operative position.

WILHELM B. BRONANDER.